Nov. 20, 1928.　　　　　　　　　　　　　　　　1,692,070
F. ATHIMON
CONTROL MEANS FOR CLUTCHES, BRAKES, AND THE LIKE
Filed Aug. 4, 1925　　　4 Sheets-Sheet 1
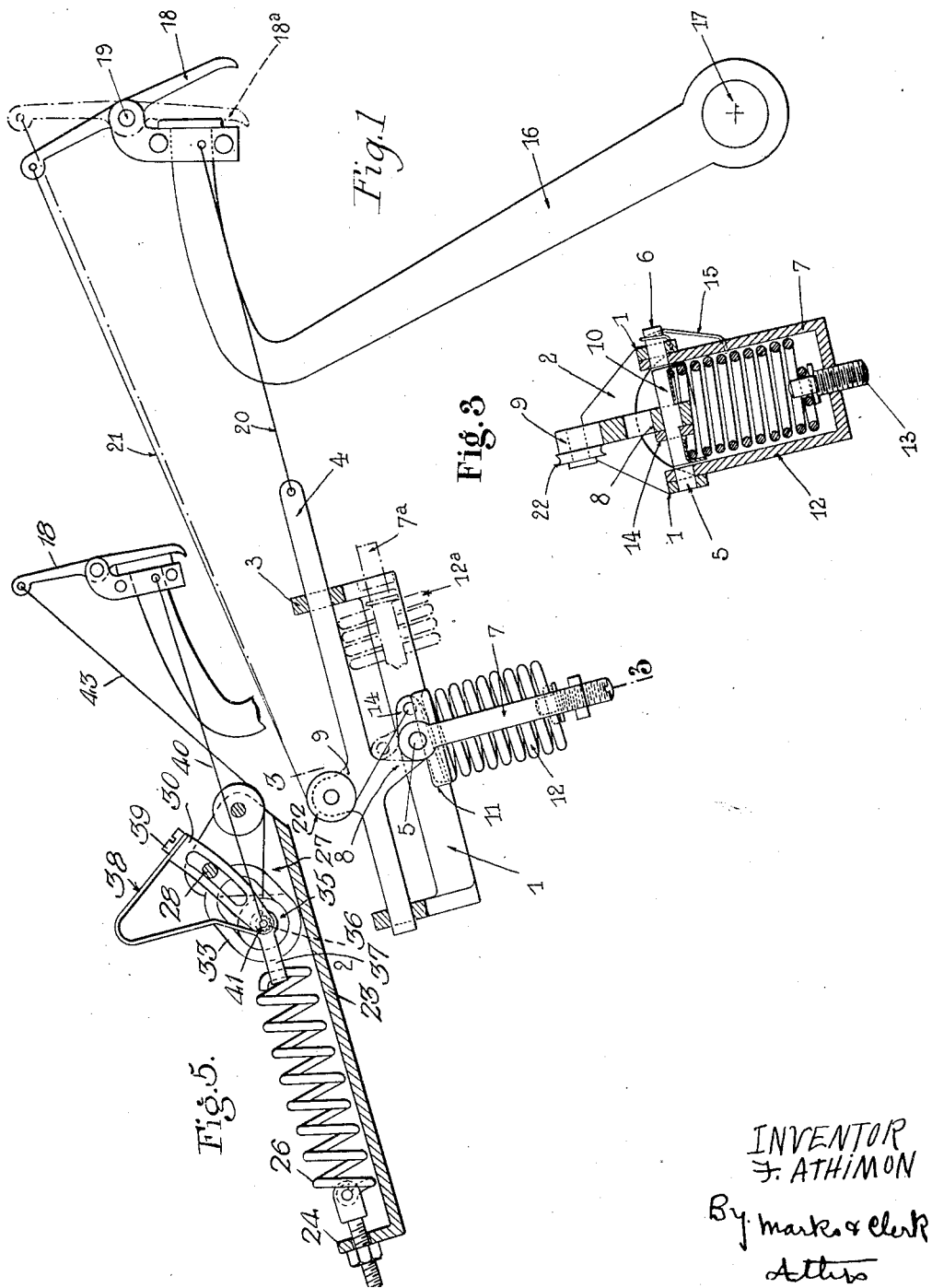
INVENTOR
F. ATHIMON
By Marks & Clerk
Attys

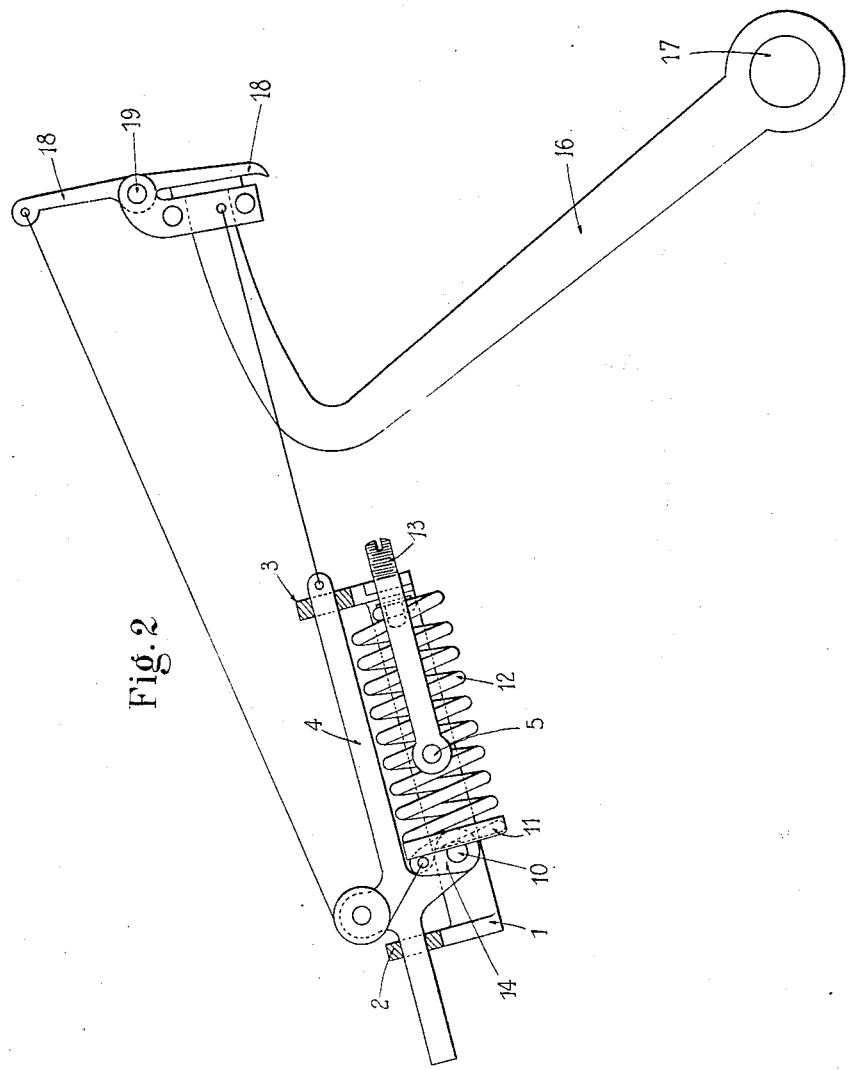

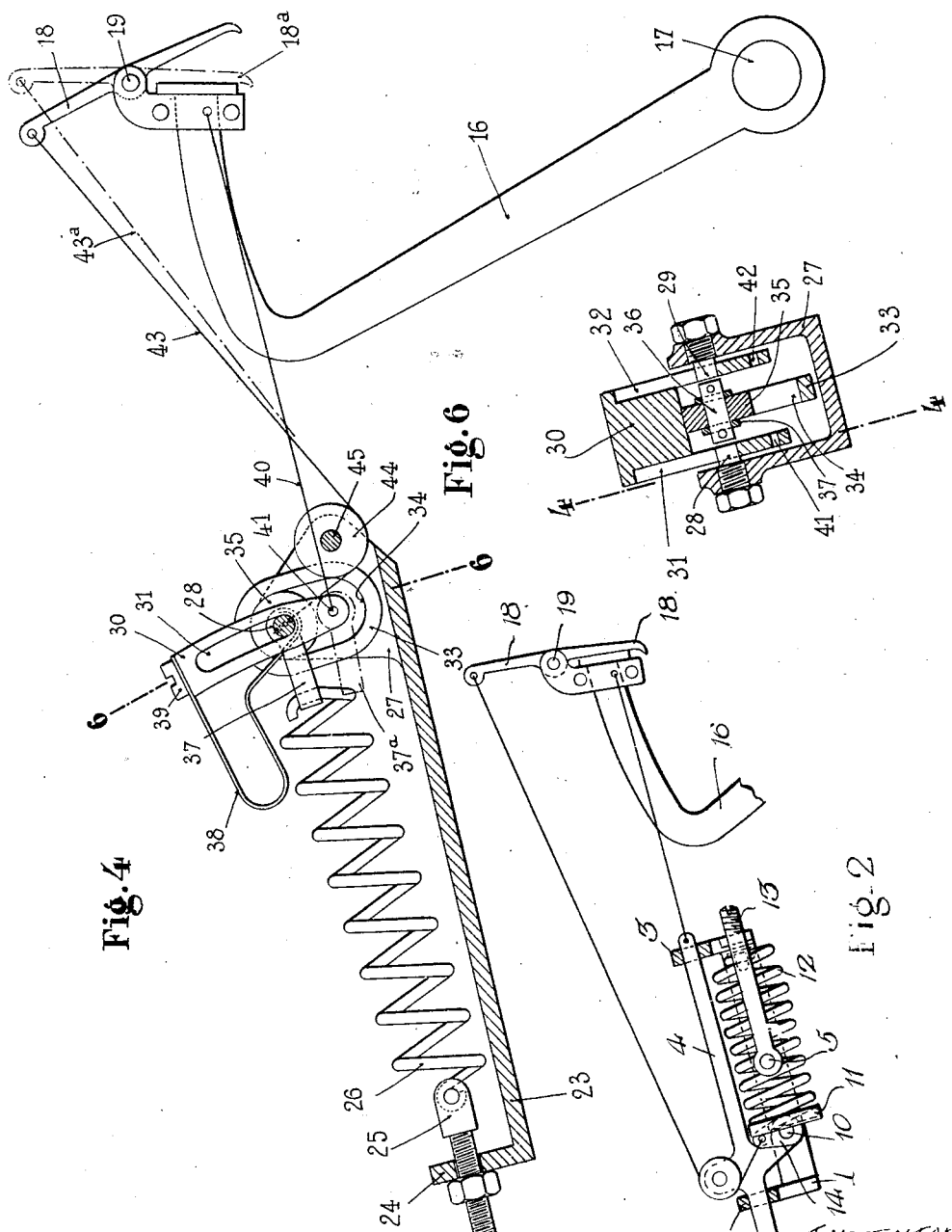

Nov. 20, 1928.　　　　　　　　　　　　　　　　　1,692,070
F. ATHIMON
CONTROL MEANS FOR CLUTCHES, BRAKES, AND THE LIKE
Filed Aug. 4, 1925　　　　4 Sheets-Sheet 4
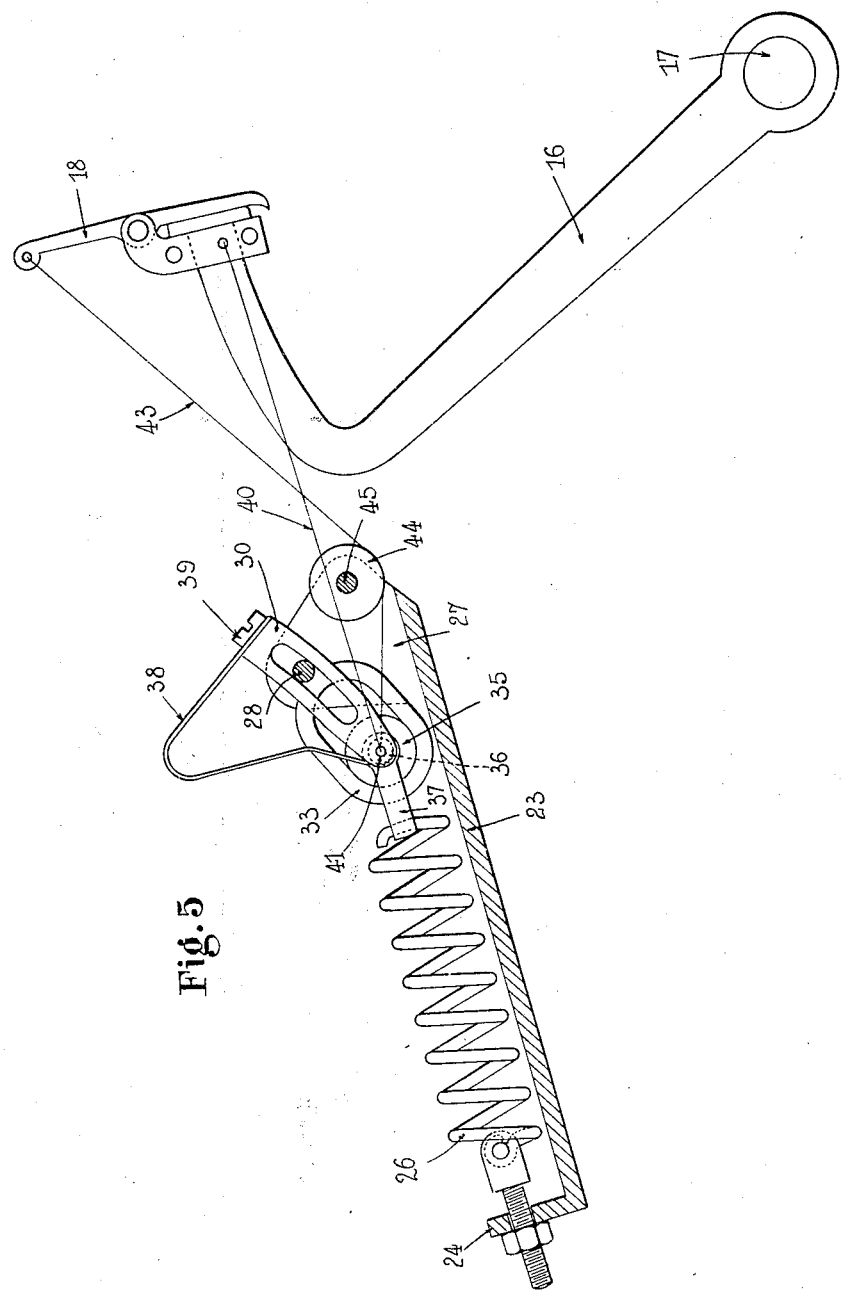

Patented Nov. 20, 1928.

1,692,070

UNITED STATES PATENT OFFICE.

FRANCIS ATHIMON, OF PARIS, FRANCE.

CONTROL MEANS FOR CLUTCHES, BRAKES, AND THE LIKE.

Application filed August 4, 1925, Serial No. 48,149, and in France August 14, 1924.

The devices employed for the control of certain mechanical parts, and chiefly for the clutches and brakes of motor vehicles, for example, are as a rule neither of an easy working nor a progressive nature. The driver is also required to exercise a relatively great effort for their operation, either to overcome the action of the clutch spring or to throw the brakes.

My invention has for its object control means whereby all such drawbacks are obviated and the operation is rendered easy and progressive, but without any increase in the control stroke. The said device is essentially characterized in that it comprises an element which is collapsible and expansible in an elastic manner and is normally subjected to deformation but without exercising any action on the clutch, brake or the like and means for bringing the said element into a position such that, by tending to resume its normal form, it will act either against the effect of the clutch spring, and will thus at least partially equilibrate this latter, or will act in order to throw the vehicle brakes.

Due to the said disposition, it is obvious that in case of a clutch the effort which is to be exercised by the driver upon the pedal or like control, to effect the unclutching movement, will be represented only by the difference between the contrary effects of the clutch spring and of the elastic element used according to the invention after said element has been brought into the proper position.

For the use of my said invention for the control of vehicle brakes, the pedal or like control member is brought back by the springs returning the braking members into their inoperative position, so that when the brakes are to be thrown, the stroke of the control member will comprise a first portion or preliminary stroke, after which the said elastic element is brought into the operative position whereby the brakes can be thrown when the driver continues his action upon the control member.

For the suitable operation of my said device, the element which is subjected to elastic deformation consists preferably of a spring, for instance a coil spring, which is normally stretched or compressed; the means employed to place the said spring in action are caused to act either upon its general direction or upon the position of one of its attaching points.

For the proper comprehension of my said invention, the following description sets forth by way of example two embodiments of the invention, with reference to the appended drawings, in which:

Fig. 1 is a side view of a control device according to the invention in the inoperative position, and Fig. 2 a like view corresponding to the operative position.

Fig. 3 is a section on the line 3—3 of Fig. 1.

Fig. 4 shows a side view of a second embodiment of the invention in the inoperative position, with a partial section on the line 4—4 of Fig. 6, and Fig. 5 is a like view corresponding to the operative position.

Fig. 6 is a section on the line 6—6 of Fig. 4.

In the construction shown in Figs. 1 to 3, 1 is the frame of the device according to the invention; said frame is secured to the vehicle frame and comprises two end lugs 2 and 3, which form the guides for a slidable rod 4; the frame 1 further comprises the two side transverse trunnions 5 and 6 to which is pivoted an oscillating strap 7. The slidable rod 4 comprises two arms 8 and 9; upon the first of the said arms is supported a spindle 10 whose ends are made flat at the bottom and are in contact with a cup-shaped member 11; a coil spring 12 which constitutes the elastic deformable (i. e. collapsible and expansible) element of the device is normally compressed between said cup-shaped element and the adjustment screw 13 carried by the strap 7. In the inoperative position (Figs. 1 and 3) the spindle 10 to which is secured a small crank lever 14 is in line with the trunnions 5 and 6. A small auxiliary spring 15 normally maintains the strap 7 substantially perpendicular to the direction of the rod 4.

The control member consisting of the pedal 16 which is mounted upon the pivot axis 17 carries at its outer end a plate 18 which is suitably pivoted thereon by means of the pin 19. The pedal is connected with the above described device on the one hand by the cable 20 connecting the rear end of the rod 4 with the main body of the pedal and on the other hand by another cable 21 connecting the plate 18 with the crank lever 14 of the spindle 10, said cable being engaged upon a guiding pulley 22 supported by the arm 9 of the rod 4.

The clutch spring, whose action must be overcome in order to throw off the clutch, is not shown in the drawings. During the time in which the several parts of the apparatus are in the positions shown in Figs. 1 and 3, the spring 12 has no action upon the pedal 16, and the clutch spring operates in the usual manner. By acting upon the plate 18 in order to bring the same into the position 18ª, shown in the dot and dash lines in Fig. 1, a tractive effort is exercised upon the cable 21 and the spindle 10 is pivoted about, together with the strap 7 and the spring 12; these two latter elements assume the positions 7ª and 12ª (Fig. 1) wherein they are only partially indicated for the sake of clearness. In this position, the spring bears at one end against the screw 13 of the said strap and pushes out the rod 4 at its other end by its action upon the arm 8 of the said rod. The effort exercised upon the rod 4 is transmitted by the cable 20 to the pedal 16, whereby the said pedal is balanced (or substantially so) under the combined action of the spring 12 and the clutch spring. Should the action of the spring 12 be less than the action of the clutch spring, the rod 4 will not be moved, and the only effect of the spring 12 will be to diminish the pressure between the clutch surfaces, for example, if the pedal 16 serves for the control of the clutch of the vehicle; it should be noted that the adhesion between the said surfaces will progressively decrease whilst the strap 7 and the spring 12 will proceed from the positions shown in the full lines in Fig. 1 to the respective positions 7ª and 12ª. By continuing the pressure on the plate 18 which is now in contact with the pedal 16, the driver can move the said pedal and thus throw off the clutch; the device will then assume the position shown in Fig. 2, the requisite effort being represented by the small difference between the effects of the two springs. When the pedal is released, the device assumes first the position shown in dot and dash lines in Fig. 1 and then that shown in full lines, under the action of spring 15. In this movement, the pressure between the surfaces in contact, and their adhesion will always vary in a progressive manner. The elastic element of the device according to the invention is caused to enter into action by modifying the direction of the action of the said element which is normally compressed. It is obvious that this action of the elastic element may be obtained by other means, such as suitable combinations of levers and for instance by displacing the pivots and the fulcrums of the said levers.

The embodiment shown in Figs. 4, 5 and 6 shows a solution of the problem by the displacement of one of the attaching points of the spring which constitutes the deformable elastic device.

In the said figures, 23 is the stationary frame of the device; at the bent-up end 24 of the said frame is mounted the adjustable forked holder 25 to which is attached one end of the coil spring 26 constituting the elastic element; the other end of the said frame constitutes a U-shaped portion 27, upon whose wings are mounted the respective trunnions 28 and 29. Between said wings is disposed a movable member 30 having on either side a slot 31, 32 respectively engaging the trunnions 28, 29 whereby the member 30 is guided and its motion limited. The member 30 further comprises a lower extension 33 having therein the elongated aperture 34 in which is movable the roller 35 (or the outer ring of a ball bearing); the spindle 36 for the said roller is mounted in a forked holder 37 to which is attached the other end of the spring 26. In the inoperative position (Figs. 4 and 5) the spindle 36 is in line with the trunnions 28 and 29, said spindle being urged into this position by an auxiliary spring 38 which is attached at 39 to the movable member 30.

The pedal 16 is mounted as in the preceding case upon a pivot shaft 17, and carries the plate 18 which is pivoted thereto by means of the pin 19; the said pedal is connected with the above described device on the one hand by two symmetrically disposed cables 40 secured to the main body of the pedal 16 and respectively at 41 and 42 to the movable member 30, and on the other hand by two cables 43 connecting the plate 18 with the spindle 36 for the roller 35 and passing over two pulleys 44 supported by an axle pin 45 carried by the frame 23.

In the inoperative position, the spring 26 is maintained under tension between the stationary fork 25 and the movable fork 37 supported by the spindle 36 which, as above mentioned, is now in line with the trunnions 28 and 29, so that the movable member 30 which is adapted to pivot and to slide upon the said trunnions will in no wise transmit to the pedal 16—by the cables 40—the effort exercised upon it by the spring 26.

If the plate 18 is brought into the position 18ª as shown in dot and dash lines in Fig. 4, the cables 43 will assume the position shown at 43ª and will tend to draw down the roller 35, so that the combination comprising the said roller, the fork 37 and the spring 26 will descend towards the frame 23 and will take the position in which the fork 37 is shown in dot and dash lines at 37ª. In this position, the member 30 will tend to pivot upon the trunnions 28 and 29 and, under the action of the spring 26 and by means of the cables 40, it will draw upon the pedal 16; the latter will now be in equilibrium (or approximately so)—with the same advantages as above set forth—between the effects of the spring 26 and of the clutch spring; the clutch surfaces will remain in contact, but will not be pressed together. By continuing to press upon the pedal 16, the member 30 is rocked and takes the position shown in Fig. 5. When this pressure ceases, the device will resume the intermediate position (shown at 37ª) and then the position shown in Fig. 4.

As concerns the use of the said invention for brake control, referring for instance to the embodiment shown in Figs. 4 to 6, this construction being maintained, the operation is subject to the following changes. The control member represented by the pedal 16 is normally urged to the rear by the springs returning the braking members to their inoperative position, and thus, by means of the cables 40, the pedal will draw upon the lower part of the member 30—in the direction of the pulley 44—thus causing said member to rock upon the trunnions 28 and 29; under the action of the cables 43, the plate 18 will thus be further opened. When the brakes are to be thrown, the pressure exercised by the driver will first bring the plate 18 from this latter position into the position shown in full lines in Fig. 4, this movement corresponding to a preliminary stroke, the member 30 also taking a position such as is shown in Fig. 4; continuing the pressure on the pedal, the several parts will be displaced as above set forth, and the spring 26, by its traction upon the cables 40, will throw the brakes.

Obviously, the constructional arrangements herein described and illustrated will by no means limit the scope of my said invention, either as regards its characteristic features or as to its field of application.

Having now described my invention what I claim as new and desire to secure by Letters Patent is:

1. In combination with a spring controlled mechanism a control member operatively connected with said mechanism and adapted to be actuated by the operator, a stationary frame provided with two trunnions in line with one another, a forked member operatively connected with said control member and the branches whereof are adapted to slide on and pivot about said trunnions, an intermediate branch provided on said forked holder, an elongated longitudinal opening in said intermediate branch, a rolling member contacting with the side edges of said opening and adapted to move thereon, a pin extending axially through said rolling member, a spring attached to said pin, means for normally maintaining said spring in the deformed state and said pin in alignment with said trunnions and means adapted to be actuated by the operator and attached to said pin for moving said rolling member within said opening.

2. In combination with a spring controlled mechanism a control member operatively connected to said mechanism, a stationary support, a movable intermediate member guided on said support and connected to the control member, an elastic element normally held in an inoperative position and in a deformed state by its engagement with the said support and intermediate member, and an auxiliary controlling member for displacing the elastic element in its deformed state relatively to the intermediate member from the inoperative position to an operative position.

3. A combination of means as recited in claim 2 in which the auxiliary controlling member is movably supported on the control member.

4. In combination with a spring controlled mechanism, a control member operatively connected with said mechanism and adapted to be actuated by the operator, a stationary frame provided with two trunnions in line with one another, a forked member operatively connected with said control member and the branches whereof are adapted to slide on and pivot about said trunnions, a movable connecting member guided in the forked member and adapted to be held normally in line with said trunnions, a spring attached to said stationary frame and said connecting member, the spring being thus normally held in an inoperative position and in a deformed state and an auxiliary controlling member for displacing the connecting member with respect to the forked member out of alignment with said trunnions, whereby the spring is displaced in its deformed state from its inoperative position to an operative position and causes movement of said forked member.

5. In combination with a spring controlled mechanism a control member operatively connected to said mechanism, a stationary support, guiding means on said support, a movable intermediate member guided in said guiding means and connected to the control member, an elastic element, means for connecting one end of said elastic element to the support, connecting means affording a displaceable connection between the opposite end of the elastic element and the intermediate member, said connecting means being normally held in such a position that said spring is deformed and acts upon said intermediate member in a direction wherein movement of said intermediate member is prevented by said guiding means and an auxiliary controlling member for displacing said connecting means with respect to the intermediate member, whereby the elastic element is caused to act upon said intermediate member in a direction wherein movement of said intermediate member is allowed by said guiding means.

In testimony whereof I have signed my name to this specification.

FRANCIS ATHIMON.